(12) United States Patent
Bennefeld et al.

(10) Patent No.: US 6,519,249 B1
(45) Date of Patent: Feb. 11, 2003

(54) SCALABLE GATEKEEPERS IN AN INTERNET TELEPHONY SYSTEM AND A METHOD OF OPERATION

(75) Inventors: Brian Joseph Bennefeld, Allen, TX (US); Patrick SzeChing Ma, Plano, TX (US); Gregory Scott Graham, Richardson, TX (US); Michael Flynn Thomas, Plano, TX (US)

(73) Assignee: Nortel Networks LTD, St. Laurent (CA)

( * ) Notice: Subject to any disclaimer, the term of this patent is extended or adjusted under 35 U.S.C. 154(b) by 0 days.

(21) Appl. No.: 09/220,549

(22) Filed: Dec. 23, 1998

(51) Int. Cl.[7] .............................. H04L 12/66; H04J 3/16
(52) U.S. Cl. ........................................ 370/352; 370/465
(58) Field of Search ................................ 370/230, 252, 370/259, 270, 285, 352, 402, 392, 389, 401, 411, 437, 465

(56) References Cited

U.S. PATENT DOCUMENTS 5,754,763 A * 5/1998 Bereiter .................... 713/201
5,983,281 A * 11/1999 Ogle et al. ................ 709/249
6,031,896 A * 2/2000 Gardell et al. ........... 379/88.17
6,161,008 A * 12/2000 Lee et al. .................. 455/414
6,229,804 B1 * 5/2001 Mortsolf et al. ........... 370/352

* cited by examiner

Primary Examiner—Wellington Chin
Assistant Examiner—Brenda Pham
(74) Attorney, Agent, or Firm—Bruce Garlick

(57) ABSTRACT

An Internet Protocol (IP) telephony system manages Gatekeeper subscriber load by assigning subscriber load among a plurality of Gatekeepers during the Gatekeeper discovery and registration process. A Registration Load Management Unit (RLMU) is primarily responsible for assigning subscriber load to the plurality of Gatekeepers. In one embodiment, the plurality of Gatekeepers are organized without a hierarchy structure and are made up of a plurality of Gatekeeper service nodes and a plurality of Gatekeeper Database nodes. The Gatekeeper service nodes provide the Registration, Admission, Status, Location, Call Set Up and other operating functions of the Gatekeeper while the plurality of Gatekeeper Database nodes store subscriber information. In a second embodiment, the plurality of Gatekeepers are organized in a hierarchy with a Root Gatekeeper at the top of the hierarchy and a plurality of Gatekeepers residing below the Root Gatekeeper in the hierarchy.

32 Claims, 8 Drawing Sheets

```
DNS FILE FOR ABC.COM

Gatekeeper   RecordType=A   IP=47.xxx.xxx.001
Gatekeeper   RecordType=A   IP=47.xxx.xxx.002
Gatekeeper   RecordType=A   IP=47.xxx.xxx.003

Gatekeeper1  RecordType=A   IP=47.xxx.xxx.001
Gatekeeper2  RecordType=A   IP=47.xxx.xxx.002
Gatekeeper3  RecordType=A   IP=47.xxx.xxx.003
```

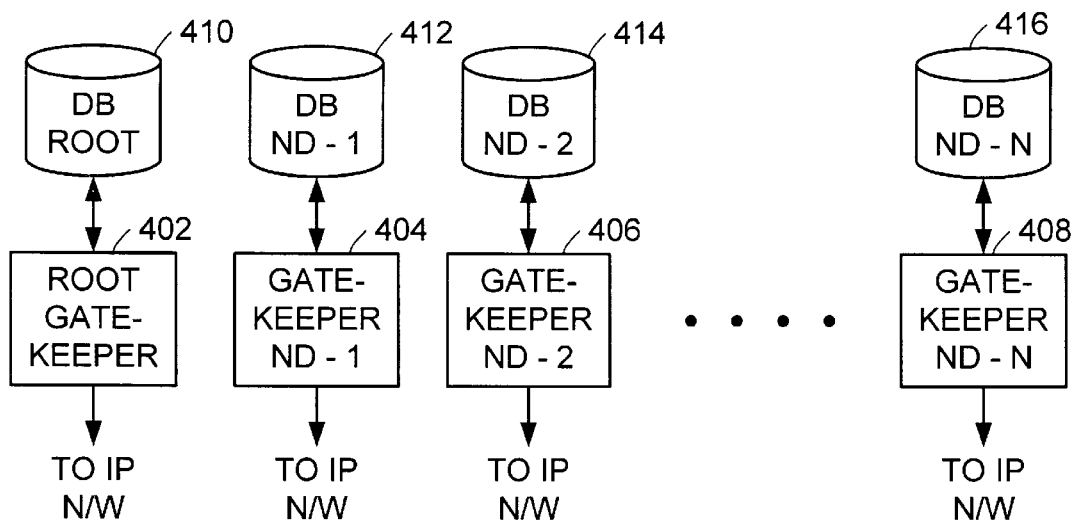
FIG. 4A
```
DNS FILE FOR ABC.COM
Gatekeeper  RecordType=A  IP=47.xxx.xxx.000
```
FIG. 4B
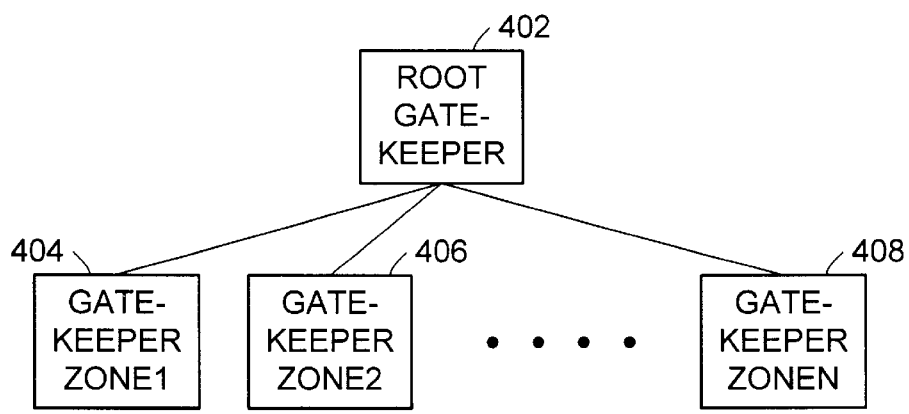
FIG. 4C

SCALABLE GATEKEEPERS IN AN INTERNET TELEPHONY SYSTEM AND A METHOD OF OPERATION

BACKGROUND

1. Technical Field

The present invention relates generally to Internet Telephony communication systems; and more particularly to a method and apparatus for distributing subscriber load among a plurality of Gatekeepers of the Internet Telephony communication system by selectively assigning subscriber load to the plurality of Gatekeepers during the discovery and registration process.

2. Related Art

Internet Protocol (IP) Telephony systems have been rapidly evolving over the past few years. In an IP telephony system, calls are routed through a packet switched Internet Protocol network (IP network). This compares to call routing in a circuit switched system, such as the Public Switched Telephone System (PSTN), in which calls are routed over dedicated circuits. In a circuit switched network, digitized information making up a call is sent in a continuous stream (when active) from a caller to a called party, and vice versa. However, in a packet switched IP Telephony system, each segment of the call is converted into IP packets, routed through the IP network, reconstructed upon exiting the IP network and then delivered to a called party.

With IP packet switching, as opposed to circuit switching, network bandwidth usage for each call may be reduced because a dedicated circuit is not created for each call. However, as is generally known, IP telephony systems networks cannot presently provide the Quality of Service (QoS) that is provided by circuit switched networks. Thus, IP telephony has yet to obtain the popularity of circuit switched telephony for voice communications which require a minimal level of QoS. Nonetheless, IP telephony systems yield acceptable results in some situations, particularly those situations in which PSTN tariffs are great, e.g., international calls. An international call placed and serviced by an IP telephony system can oftentimes be made for the cost of a local phone call.

In initiating a call in an IP telephony system, a calling endpoint couples to the IP network via a source Gateway, oftentimes coupling to the source Gateway via the PSTN or another network, e.g., Local Area Network or Wide Area Network. The source Gateway then interfaces with a Gatekeeper to set up the call. The Gatekeeper sets up the call with a called endpoint, usually via a destination Gateway. The call is then routed from the caller, through the source Gateway, via the IP network to the destination Gateway, and from the destination Gateway to the called party. From the destination Gateway to the called party, the call may be routed via the PSTN. The source and destination Gateways convert the call between IP based data packets that are routed across the IP network and the circuit switched counterparts that are received from, and delivered to the endpoints via the PSTN.

Service providers install the infrastructure required to provide the IP telephony service. In providing the service, the service providers generally route all calls through their Gatekeepers. By routing the calls through their Gatekeepers, the service provider monitors usage for billing purposes, alters IP network routes to compensate for outages and routes calls to various destination Gateways to balance load upon the destination Gateways.

In a typical IP telephony system, the service provider initially installs and maintains a single Gatekeeper that services all its IP telephony calls. With the many varied tasks required of the Gatekeeper, however, the Gatekeeper tends to become overloaded, thereby slowing its operation and degrading the service it provides. When such overloading occurs, the service provider deploys additional Gatekeepers within the system to handle the additional load.

With multiple Gatekeepers, it is desirable to distribute load among the Gatekeepers. Distribution of load among Gatekeepers is generally performed during subscriber registration, wherein a subscriber to the IP telephony system is assigned to a particular Gatekeeper. Under the H.323 Recommendation, for example, a component called Registration/Admission/Status (RAS) assigns each subscriber to the system to a particular Gatekeeper during a Gatekeeper discovery and registration process. In such a process, the subscriber is generally provided with the domain name of a first assigned Gatekeeper and may also be provided with the name of a second assigned Gatekeeper. The subscriber first seeks to register with the first assigned Gatekeeper. However, if the first assigned Gatekeeper refuses the subscriber's Gatekeeper Registration request, the subscriber attempts to register with the second assigned Gatekeeper. Upon registration, the assigned Gatekeeper stores the subscriber's registration information and services subsequent calls for the subscriber.

When a service provider has one Gatekeeper, static assignment simply places all load on the Gatekeeper. However, when additional Gatekeepers are deployed, loading is not equal among the then deployed Gatekeepers and load equalization requires de-registration of subscribers and subsequent re-registration of the subscribers, a burdensome process. Further, when many Gatekeepers are deployed, static assignment functions poorly to distribute subscriber load among the many Gatekeepers.

Thus, there is a need in the art for an IP telephony system in which subscriber load may be distributed among multiple Gatekeepers in a fashion that is seamless to the subscribers of the system, so that Gatekeepers may be added and removed as required without introducing additional overhead to the subscribers and so that the additions and removals may be made without disrupting service.

SUMMARY OF THE INVENTION

Thus, to overcome the shortcomings of the prior systems, among other shortcomings, an Internet Protocol (IP) telephony system constructed according to the present invention manages Gatekeeper subscriber load by partitioning Gatekeepers and by distributing subscriber load during the Gatekeeper discovery and registration process. The IP telephony system includes a plurality of Gatekeepers, each of which may include a Registration Load Management Unit (RLMU). A RLMU may also be resident upon one or more Domain Name Servers (DNSs) servicing the IP network(s) over which the IP telephony system operates so that the RLMU may user the DNS to assist in load distribution.

In a first embodiment of the present invention, a plurality of Gatekeepers are organized without a hierarchy structure. In such case, the plurality of Gatekeepers are made up of a plurality of Gatekeeper service nodes and a plurality of Gatekeeper Database nodes. The Gatekeeper service nodes provide the Registration, Admission, Status, Location, Call Set Up and other operating functions of the Gatekeeper while the plurality of Gatekeeper Database nodes store subscriber information. Each of the Gatekeeper service nodes has access to each of the plurality of Gatekeeper Database nodes.

With the functions of the Gatekeepers divided in this manner, when the Gatekeepers as a whole cannot handle the operating functions required for the subscriber set, an additional Gatekeeper service node may be added. Likewise, when the Gatekeeper Database nodes become filled with subscriber data, another Gatekeeper Database node may be added. Thus, the structure provides for full scalability and seamless scalability as viewed by the subscriber.

In the first embodiment, subscriber load is assigned to the plurality of Gatekeeper service nodes by the RLMU located in the DNS. Each of the plurality of Gatekeeper service nodes includes a corresponding A record in the DNS with its RAS TSAP. Using a load distribution algorithm, such as a round-robin technique, the RLMU in the DNS distributes subscriber load among the plurality of Gatekeeper service nodes when the subscriber accesses the DNS seeking the RAS TSAP of its Gatekeeper. When additional Gatekeeper service nodes are introduced into the IP telephony system, additional entries are made in the DNS for the additional Gatekeeper service nodes. Further, when Gatekeeper service nodes are removed from the IP telephony system, corresponding DNS entries must also be removed from the DNS.

In a second embodiment of the present invention, a plurality of Gatekeepers are organized in a hierarchy structure with a Root Gatekeeper at the top of the hierarchy and a plurality of Gatekeepers residing below the Root Gatekeeper in single or multiple levels of hierarchy. All Registration requests are directed to the Root Gatekeeper. Upon receipt of a Registration request, a RLMU in the Root Gatekeeper selects one of the Gatekeepers it manages to service the subscriber. Each of the plurality of Gatekeepers provides both operating and database functions. Thus, each of the Gatekeepers stores its own registration data. The Root Gatekeeper tracks the assignment of subscribers to Gatekeepers.

With the functions of the Gatekeepers divided in this manner, when the Gatekeepers as a whole cannot handle the operating functions required for the subscriber set, additional Gatekeepers may be added. Because all Registration, Location and Admission Requests are directed to the Root Gatekeeper, scaling is easily achieved by adding or removing Gatekeepers. Thus, the structure provides for seamless scalability as viewed from the subscriber and the DNS.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which:

FIG. 4A is a block diagram illustrating the construction and intercoupling of a plurality of Gatekeepers according to a second embodiment of the present invention;

FIG. 4B is a diagram illustrating a record contained in a Domain Name Server for the Gatekeepers of FIG. 4A;

FIG. 4C is a block diagram illustrating one possible hierarchy structure of the plurality of Gatekeepers of FIG. 4A;

DETAILED DESCRIPTION OF THE DRAWINGS

Figure 1:
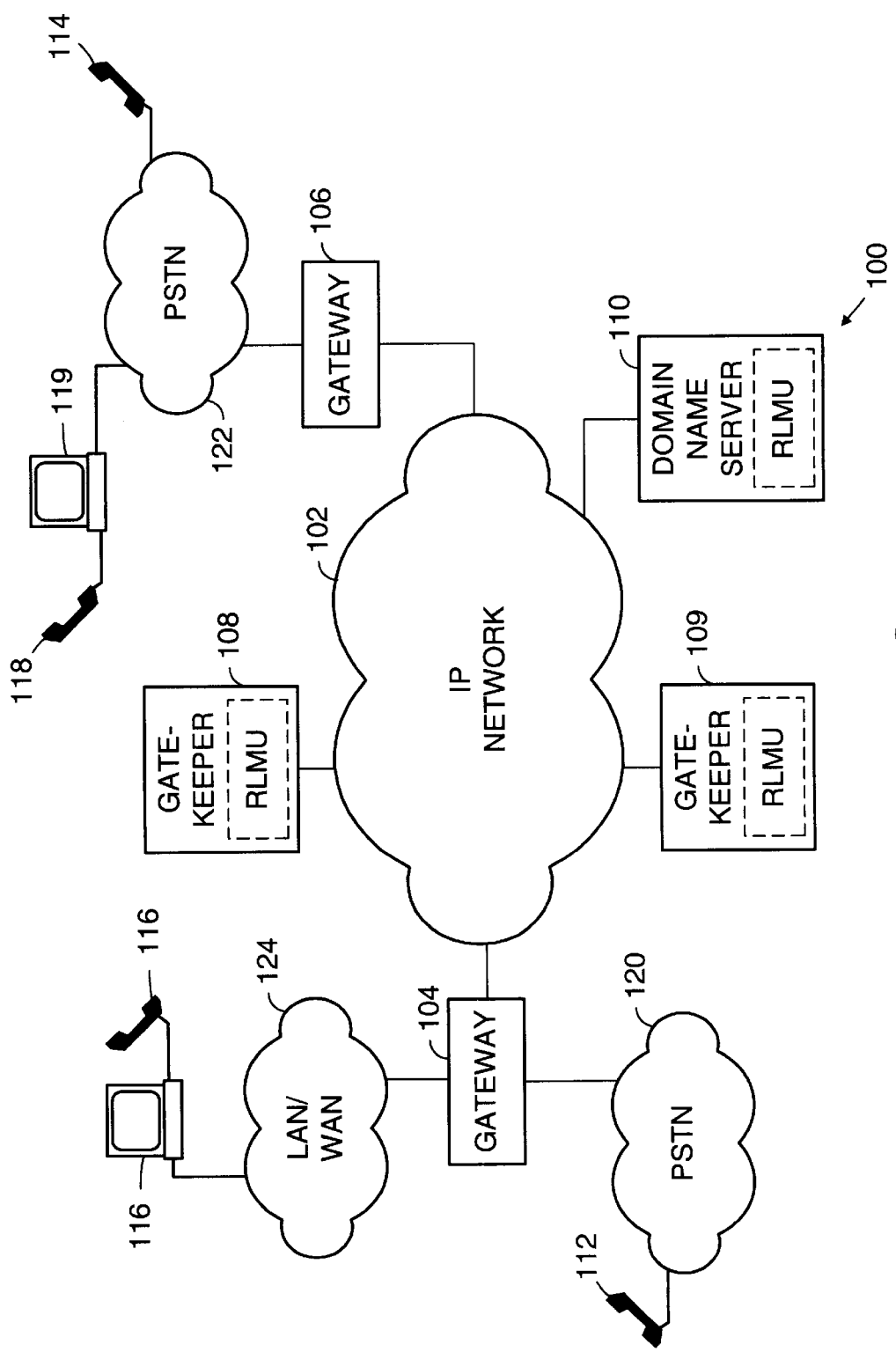
FIG. 1 is a system diagram illustrating an Internet Protocol telephony system constructed according to the present invention in which subscriber loading on a plurality of Gatekeepers is managed.

FIG. 1 is a system diagram illustrating an Internet Protocol (IP) telephony system constructed according to the present invention in which subscriber loading on a plurality of Gatekeepers is managed. Referring to FIG. 1, the IP telephony system includes a plurality of Gateways 104 and 106 coupled to an IP network 102. The system also includes a plurality of Gatekeepers 108 and 109 that are also coupled to the IF network 102. Together, the Gateways 104 and 106 and Gatekeepers 108 and 109 provide IP telephony service to a plurality of endpoints 112, 114, 116 and 118.

As can been seen, the Gateways 104 and 106 couple endpoints 112 and 114 to the IP network 102 via respective segments of the Public Switched Telephone Network (PSTN) 120 and 122. The Gateways 104 and 106 therefore convert calls serviced by the endpoints 112 and 114 between a PSTN circuit switched data format and IP data packets. Thus, the Gateways 104 and 106 include Coder/Decoders (CODECs), digital processing equipment, networking equipment and other equipment required for data conversion functions and network management functions.

Endpoints that are coupled to Gateways (or to the IP network 102 itself) may also be serviced according to the present invention. For example, endpoint 116 couples to Gateway 104 via a host computer 120 and a local area network or wide area network (LAN/WAN) 124. In such example, the LAN/WAN 124 may support the IP protocol. Thus, the host computer 120 includes a CODEC which converts data that makes up a call between a format compatible with the endpoint 116 and the LAN/WAN 124. In a particular example of construction of the host computer 120, the host computer 120 includes a sound card which connects directly to the endpoint 116. The sound card receives analog signals from-the endpoint 116 and converts them to digital equivalents. The sound card also receives digital signals, converts the digital signals to an equivalent analog signal, and delivers the equivalent analog signal to the endpoint 116.

Another type of endpoint supported by the IP telephony system is the endpoint 118 supported by a host computer 119 that couples to Gateway 106 via PSTN segment 122. In such an installation, the endpoint 118 couples to the host computer 119 via a sound card as described above. The host computer 119 then couples to the Gateway 106 via the PSTN segment 122 over an analog or digital line using an appropriate modem, e.g., analog modem, Integrated Services Digital Network (ISDN) modem, T-1 modem, etc. The Gateways 108 and 109 perform call set up and servicing functions for calls established using the IP telephony system. As will be further described herein, each Gatekeeper 108 and 109 may include a Registration Load Management Unit (RLMU). The RLMU(s) are responsible for distributing subscriber load among the Gatekeepers 108 and 109.

The Gateways 104 and 106 and Gatekeepers 108 and 109 may operate in compliance with the H.323 standard promulgated by the International Telecommunications Union (ITU-T). The H.323 standard covers the technical requirements for audio and video communications services in networks that do not provide a guaranteed Quality of Service (QoS), e.g., the IP network 102. The scope of H.323 does not include the IP network 102 itself or the transport layer that may be used to connect various networks (such as. the IP network 102 and LAN/WAN 124). Elements needed for interaction with the PSTN 120 or 122 are also within the scope of H.323. As pertinent to the present invention, H.323 includes specifications for endpoints, Gateways and Gatekeepers.

Endpoints, such as endpoints 112, 114, 116 and 118, are the client endpoints that provide real-time, two-way voice communications. H.323 specifies the modes of operation required for different audio endpoints that work together. All H.323 endpoints support H.225 which specifies call signaling protocol and is employed to negotiate channel usage and capabilities. H.323 also includes a component called Registration/Admission/Status (RAS) which endpoint units optionally use to communicate with a Gatekeeper during registration, admission and status operations.

Gateways, e.g., 104 and 106, are optional elements in an H.323 call. Gateways provide many services, the most common being a translation function between H.323 calling endpoints and other endpoint types. This function includes translation between transmission formats (e.g., H.225.0 to H.221) and between communications procedures (e.g., H.245 to H.242). In addition, the Gateways 104 and 106 also perform operations during call set up and call clearing on both the IP network 102 side and the PSTN 120 and 122 side.

Operations supported by the Gateways 104 and 106 include establishing links with analog PSTN endpoints, establishing links with remote H.320-compliant endpoints over ISDN-based circuit-switched networks, and establishing links with remote H.324-compliant endpoints over PSTN networks. Gateways are not required if connections to other networks are not needed, since endpoints may directly communicate with other endpoints on the same packet switched network, such as the LAN/WAN 124 or IP network 102.

The Gatekeepers 108 and 109 act as the central point for all calls within their respective Gatekeeper zones and provide call control services to registered endpoints. In many ways, an H.323 Gatekeeper acts as a virtual switch. Gatekeepers 108 and 109 perform two important call control functions. The first is address translation from network aliases for endpoints and Gateways to IP or IPX addresses. The second function is bandwidth management. For instance, if a network manager has specified a threshold for the number of simultaneous conferences on the network, the Gatekeeper 108 or 109 can refuse to make any more connections once the threshold is reached.

The collection of all endpoints and Gateways managed by a single Gatekeeper 108 or 109 is known as the Gatekeeper zone. Thus, when an IP telephony system operator deploys multiple Gatekeepers, such as illustrated with Gatekeepers 108 and 109, each Gatekeeper is responsible for a Gatekeeper Zone, a set of registered subscribers or another portion of the load serviced by the IP telephony system (such divisions generally referred to as "load segments"). While a Gatekeeper 108 or 109 is logically separate from Gateways 104 and 106, vendors may incorporate Gatekeeper functionality into the physical implementation of Gateways 104 or 106. Thus, the devices may be co-located where a service provider has available physical space.

An optional, but valuable feature of a Gatekeeper 108 or 109 is its ability to route H.323 calls. By routing a call through a Gatekeeper 108 or 109, the call may be controlled more effectively. Service providers need this ability in order to user the Gatekeeper 108 to bill for calls placed through their network. This service can also be used to re-route a call to another endpoint if a called endpoint is unavailable.

According to the present invention, subscribers are registered with the Gatekeepers 108 and 109 to distribute subscriber load among the Gatekeepers 108 and 109. The RLMUs, which may be present in the Gatekeepers 108 and 109 as well as in the Domain Name Server (DNS) 110, work in conjunction with the Gatekeepers to equalize loading among the Gatekeepers 108 and 109 to meet the goals of the system operator.

According to one aspect of the present invention, the DNS 110 distributes subscriber load among the Gatekeepers 108 and 109 when a subscriber seeking Gatekeeper registration queries the DNS 110 for the RAS TSAP of its serving Gatekeeper. In such an operation, the DNS 110 accesses its RLMU that employs a round-robin or other assignment to direct subscribers to the available Gatekeepers. In such case, the RLMU may reside solely upon the DNS 110. Such distribution operations may be similar to other operations employed to distribute load among a plurality of entities sharing a domain name.

According to another aspect of the present invention, a Root Gatekeeper is deployed within the system. During RAS registration, the DNS 110 directs all subscribers to the Root Gatekeeper. However, the Root Gatekeeper performs the round-robin or other assignment to direct the subscribers to the available Gatekeepers. Thus, in this aspect also, subscriber load is distributed among the available Gatekeepers.

Figure 2:
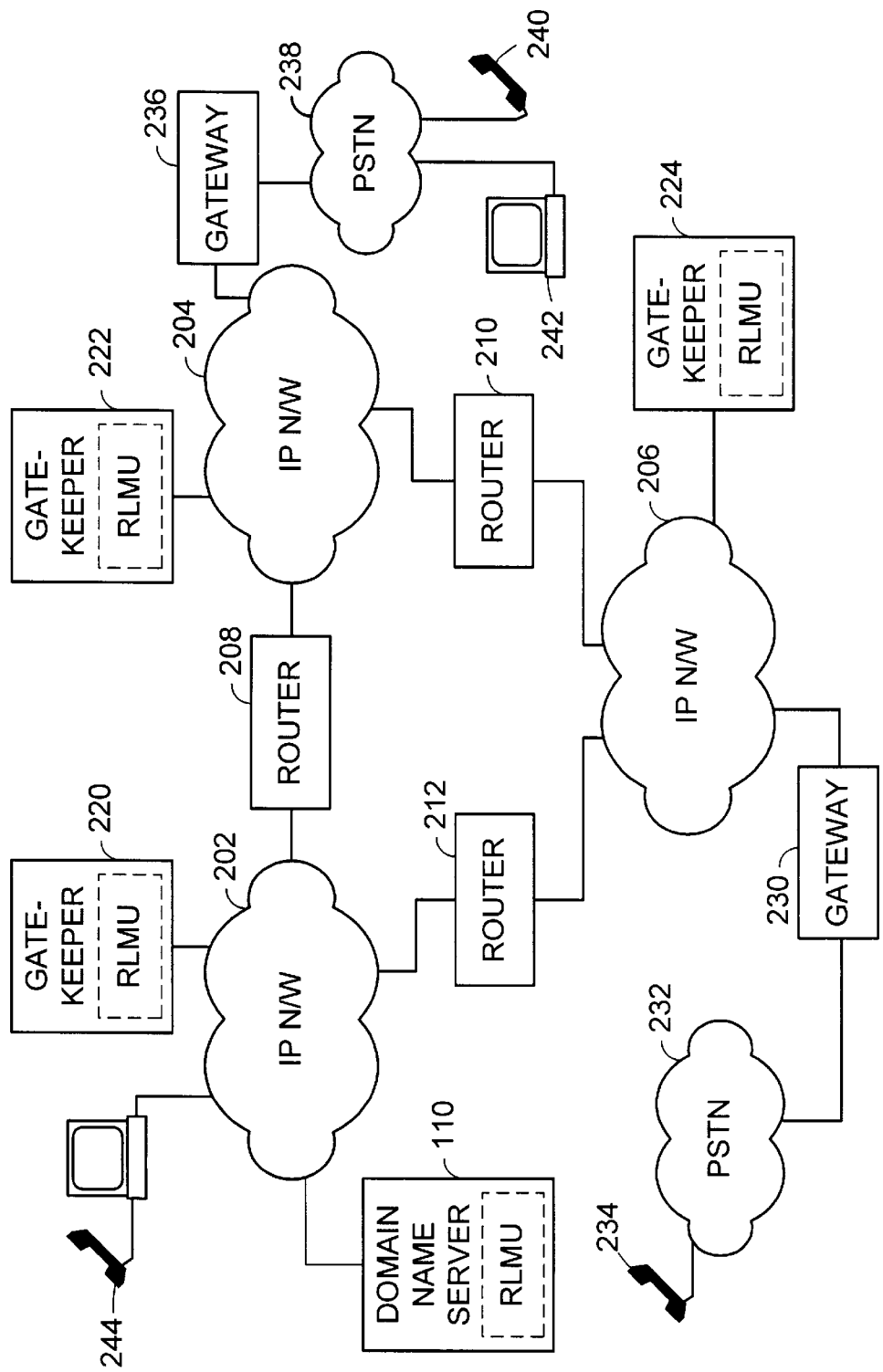
FIG. 2 is a system diagram illustrating an alternate construction of an Internet Protocol telephony system constructed according to the present invention.

FIG. 2 is a system diagram illustrating an alternate construction of an Internet Protocol telephony system constructed according to the present invention. As shown, the IP telephony system routes calls via three different IP networks 202, 204 and 206. These IP networks may comprise three private IP networks, a combination of public and private IP networks or three public IP networks. As an alternate view of the IP networks, the three IP networks 202, 204 and 206 comprise three Gatekeeper zones of an IP network. In any case, the IP networks 202, 204 and 206 are intercoupled by routers 208, 210 and 212.

A respective Gatekeeper serves each of the three IP networks 202, 204 and 206. As is shown Gatekeepers 220, 222 and 224 serve IP networks 20,2, 204 and 206 respectively. The Gatekeepers 220, 222 and 224 are constructed to have on-board RLMUs (as is shown) or to be serviced by DNS 110 that includes a RLMU or RLMU-like functionality. In any case, the subscriber loading is distributed among the Gatekeepers 220, 222 and 224 supporting the IP telephony services according to the present invention.

As is shown, endpoint 234 couples to IP network 206 via the PSTN 232 and Gateway 230. Further, endpoints 240 and 242 couple to IP network 204 via the PSTN 238 and Gateway 236. As is shown, endpoint 242 is a computer having multimedia capability and including a microphone and speakers, but being without a standard handset. Moreover, endpoint 244 couples directly to IP network 202. Of course, many additional endpoints may also couple to the IP networks 202, 204 and 206 via various system components.

Figures 3A, 3B:
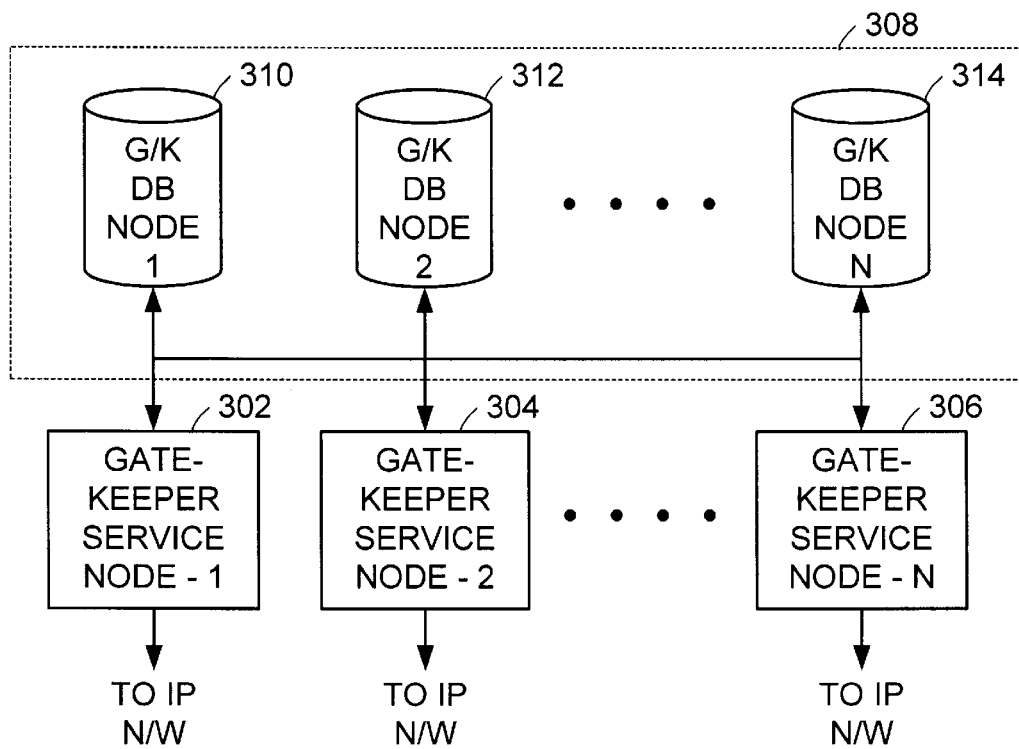
FIG. 3A is a block diagram illustrating the construction and intercoupling of a plurality of Gatekeeper service nodes and a plurality of Gatekeeper database nodes servicing an IP telephony system constructed according to the present invention.
FIG. 3B is a diagram illustrating records contained in a Domain Name Servers for the Gatekeepers of FIG. 3A.

FIG. 3A is a block diagram illustrating the construction and intercoupling of a plurality of Gatekeeper service nodes and a plurality of Gatekeeper database nodes servicing an IP telephony system constructed according to the present invention. As is shown, Gatekeeper service nodes 302, 304 and 306 couple to the IP network at respective coupling locations. These respective coupling locations may be geographically separated or may be in a common facility. In any case, each of the Gatekeeper service nodes 302, 304 and 306 possesses a unique RAS TSAP, the RAS TSAP including an RAS port and an IP address. Thus, each of the Gatekeeper service nodes 302, 304 and 306 is accessed independently during an RAS registration operation.

The Gatekeeper service nodes 302, 304 and 306 couple to Gatekeeper database nodes 310, 312 and 314. Together, the Gatekeeper database nodes 310, 312 and 314 form the Gatekeeper database 308. The Gatekeeper database nodes 310, 312 and 314 store registration information for subscribers of an IP telephony system. According to the illustrated construction, any of the Gatekeeper service nodes 302, 304 or 306 may store/retrieve data on/from any of the Gatekeeper database nodes 310, 312 and 314. Thus, the Gatekeeper service nodes 302, 304 and 306 are intercoupled to the Gatekeeper database nodes 310, 312 and 314 to allow such storage and retrieval.

In one particular embodiment, the Gatekeeper service nodes 302, 304 and 306 and the Gatekeeper database nodes 310, 312 and 314 are each implemented upon digital computers, the construction of which are well known. In such case, the Gatekeeper service nodes 302, 304 and 306 and the Gatekeeper database nodes 310, 312 and 314 may be intercoupled via a local area network. However, when the Gatekeeper service nodes 302, 304 and 306 and the Gatekeeper database nodes 310, 312 and 314 are remotely located from one another, the devices may couple by the IP network or dedicated connections (e.g., T-1, ISDN, etc.) that enable the required storage and retrieval of registration information.

Because the Gatekeeper service nodes 302, 304, and 306 are independent of one another, additional Gatekeeper service nodes may be added when a servicing capacity provided by the Gatekeeper service nodes is exceeded. Additionally, when the storage capacity of the Gatekeeper database nodes 310, 312 and 314 is exceeded, additional Gatekeeper database nodes may be added to increase the total available storage capacity. In such case, the intercoupling would be extended to include the newly added Gatekeeper service node and/or Gatekeeper database node.

FIG. 3B is a diagram illustrating records contained in a Domain Name Server for the Gatekeeper service nodes of FIG. 3A. Because each of the Gatekeeper service nodes 302, 304 and 306 possesses a unique RAS TSAP, subscriber loading must be assigned so that the subscriber loading on the Gatekeeper service nodes 302, 304 and 306 is substantially equal. According to the present embodiment, the DNS performs distributed subscriber loading by enacting its RLMU to assign subscribers to available Gatekeeper service nodes during a Gatekeeper discovery process.

During the Gatekeeper discovery process, a subscriber seeking registration queries the DNS with the domain name of the system in which he or she seeks registration, e.g., "ABC.com". As illustrated, three A records for "Gatekeeper" under ABC.com exist; one A record for "Gatekeeper1", one A record for "Gatekeeper2" and one A record for "Gatekeeper3". In one embodiment, the A records contain only the IP addresses of the Gatekeepers and a default RAS port of "1718" is assumed. As is shown, two A records exist for each respective Gatekeeper service nodes, one A record indexed under Gatekeeper and one indexed under GatekeeperX, where X is 1, 2 or 3 as illustrated. Thus, the RAS TSAP of each Gatekeeper service node may be accessed directly as well.

In response to the query, the DNS determines that a subscriber is seeking discovery of a Gatekeeper for the IP telephony system. Thus, it initiates operation of the RLMU, which is a software entity operating on the DNS. The RLMU employs a subscriber load balancing algorithm to select Gatekeeper1, Gatekeeper2 or Gatekeeper3 for the requesting subscriber. The subscriber load balancing algorithm employed may simply be a round-robing scheme among the three available Gatekeeper service nodes. Alternatively, the load balancing algorithm may keep track of the number of previous assignments, the operating duration of each Gatekeeper service node has operated, historical loading patterns for each Gatekeeper service node or such other information as would indicate which of the Gatekeeper service nodes should be loaded with the subscriber. After selection, the DNS returns the RAS TSAP of the selected Gatekeeper service node to the subscriber.

FIG. 4A is a block diagram illustrating the construction and intercoupling of a plurality of Gatekeepers according to a second embodiment of the present invention. In the embodiment, a Root Gatekeeper 402 receives all Registration requests and distributes the subscriber load among a plurality of Gatekeepers 404, 406 and 408. As shown, the Root Gatekeeper 402 couples to a Root Gatekeeper database 410 while the Gatekeepers 404, 406 and 408 couple to database nodes 412, 414 and 416, respectively.

In the embodiment, the Root Gatekeeper 402 receives all RAS discovery requests and operates a RLMU contained thereon to distribute the assignment of subscribers to the plurality of Gatekeepers 404, 406 and 408 to equalize subscriber loading on the Gatekeepers 404, 406 and 408. In its database 410 therefore, the Root Gatekeeper 402 tracks the subscriber assignments to the plurality of Gatekeepers 404, 406 and 408. The Gatekeeper database nodes 412, 414 and 416 store subscriber information for subscribers registered on the respective Gatekeepers 404, 406 and 408. In subsequent operations, such as Location Requests and Admission Requests, the Requests are received by the Root Gatekeeper and routed to the serving Gatekeeper.

FIG. 4B is a diagram illustrating a record contained in a Domain Name Server for the Gatekeepers of FIG. 4A. As illustrated, a single A record exists for Gatekeeper in the DNS corresponding to the domain name ABC.com. The DNS therefore responds to all Gatekeeper discovery requests directed to ABC.com with the RAS TSAP of the Root Gatekeeper 402. Because the Root Gatekeeper 402 performs the subscriber load distribution operations, the DNS simply directs all Gatekeeper discovery queries to the Root Gatekeeper 402. Using such a technique, multiple root gatekeepers may be supported by the DNS.

FIG. 4C is a block diagram illustrating one possible hierarchy structure of the plurality of Gatekeepers of FIG. 4A. In the structure, the Root Gatekeeper 402 distributes all of the subscriber load to the Gatekeepers 404, 406 and 408 by enacting its RLMU. However, in a variation of the embodiment, the Root Gatekeeper 402 retains a portion of the subscriber load. In either case, the RLMU must divide the load, preferably in a logical manner that provides advantages in subsequent call admission, de-registration and other operations serviced by the Gatekeepers 404, 406 and 408. When additional Gatekeepers are added, the Root Gatekeeper 402 itself may redistribute load among the Gatekeepers by directing registration information to be moved from one Gatekeeper to another Gatekeeper and to alter the Gatekeeper assignment it tracks.

In one particular technique for segregating subscriber load, subscriber identities are employed. For example, if a subscriber name is "johndoe", the subscriber is assigned to the gatekeeper servicing subscribers having subscriber names that begin with "j". In another example, each of the Gatekeepers 404, 406 and 408 services a particular sub-domain. Subscribers typically connect to the IP network via a Gateway with a particular IP address or themselves possess a particular IP address. During the Gatekeeper discovery process, the RLMU assigns the subscriber to the particular Gatekeeper that has been assigned to the sub-domain possessing the IP address. In still another operation, the RLMU determines the subscriber load on each Gatekeeper 404, 406 and 408 when the assignment decision is made and assigns the subscriber to the least loaded Gatekeeper.

Figure 5A:
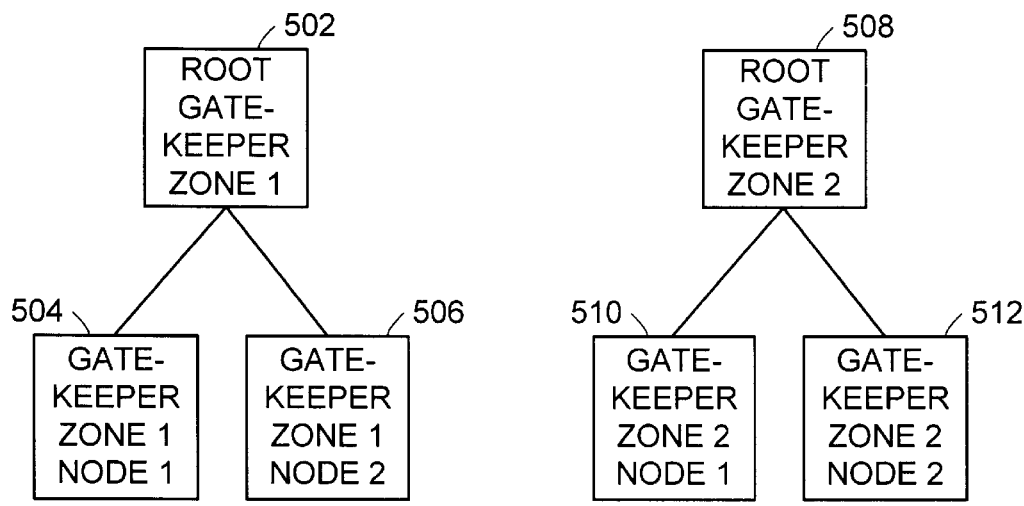
FIG. 5A is a block diagram illustrating a hierarchy structure of a plurality of Gatekeepers serviced by multiple Root Gatekeepers.

FIG. 5A is a block diagram illustrating a hierarchy structure of a plurality of Gatekeepers serviced by multiple Root Gatekeepers. As shown, Root Gatekeeper 502 operates in Zone 1 and controls subscriber loading of Gatekeepers 510 and 512 for Zone 1. Likewise, Root Gatekeeper 508 operates in Zone 2 and controls subscriber loading of Gatekeepers 504 and 506 for Zone 2. However, in the IP telephony system, a single Root Gatekeeper is insufficient to service the required number of discovery and location requests.

Thus, two Root Gatekeepers 502 and 508 have been deployed, each of which assigns subscriber load to a respective set of Gatekeepers. Since two Root Gatekeepers 502 and 508 have been deployed, the DNS includes two RAS A records for the domain name, one for Root Gatekeeper 502 and one for Root Gatekeeper 508. A RLMU in the DNS may, in such case, perform subscriber load balancing operations to balance load between the two Root Gatekeepers 502 and 508.

Figure 5B:
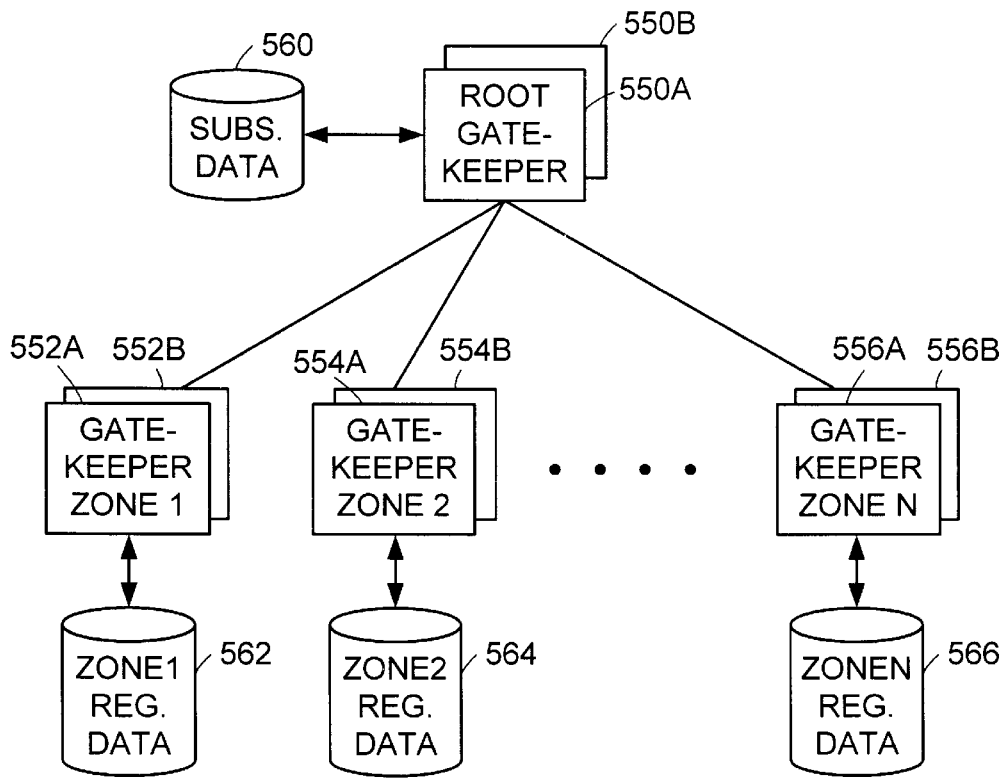
FIG. 5B is a block diagram illustrating still another hierarchy structure of a plurality of Gatekeepers serviced by multiple Root Gatekeepers.

FIG. 5B is a block diagram illustrating still another hierarchy structure of a plurality of Gatekeepers serviced by multiple Root Gatekeepers. In the hierarchy structure, parallel Root Gatekeepers 550A and 550B service the IP telephony system. The parallel structure may be employed for redundancy/security purposes or to distribute processing load. Subscriber data is stored in a database 560 coupled-to the Root Gatekeepers 550A and 550B.

The parallel Root Gatekeepers 550A and 550B couple to parallel sets of Gatekeepers 552A and 552B, 554A and 554B and 556A and 556B which couple to registration databases 562, 564 and 566, respectively. The purpose for having such parallel Gatekeepers 552A and 552B, 554A and 554B, and 556A and 556B may also be for redundancy/security purposes, to distribute processing load or for other purposes.

Figure 6:
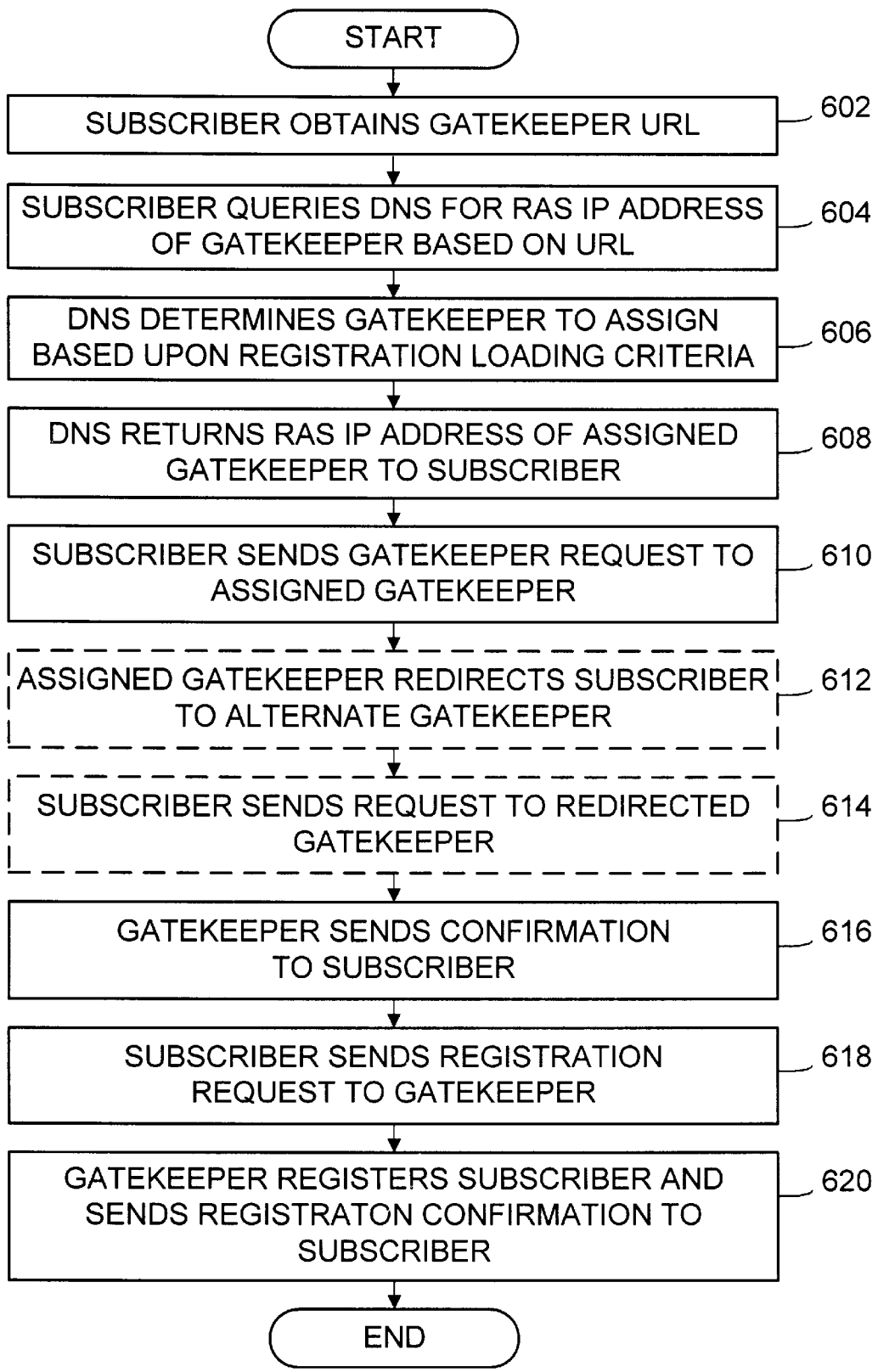
FIG. 6 is a logic diagram illustrating a Gatekeeper discovery and registration process according to the present invention for the Gatekeeper structure of FIG. 3A.

FIG. 6 is a logic diagram illustrating a Gatekeeper discovery and registration process according to the present invention for the Gatekeeper structure of FIG. 3A. Operation commences at step 602 wherein the subscriber obtains the Fully Qualified Domain Name (FQDN) for the Gatekeeper of the IP telephony system. According to the present invention, each subscriber is provided with the same FQDN, e.g., ABC.com. Such a FQDN is typically received from the service provider for the IP telephony system when the subscriber joins. However, in many operations, the subscriber may have only partial information identifying the gatekeeper. In such case, the subscriber initiates a query to the DNS that includes the term "gatekeeper" and the information possessed for the FQDN. An example of such a query would be gatekeeper.ABC.com. The DNS would then receive the information provided and attempt to locate a gatekeeper for the domain. SVR records may also be used for the location operation, such SVR records being particularly useful in correlating the gatekeeper to its domain(s).

Next, at step 604, the subscriber queries the DNS for the RAS TSAP of the Gatekeeper corresponding to the FQDN ABC.com. At step 606, in conjunction with operation of a RLMU located upon the DNS, the DNS determines the Gatekeeper to which the subscriber will be assigned. Then, at step 608, the DNS returns the address(es) of the assigned Gatekeeper to the subscriber.

The subscriber then sends a Gatekeeper Request to the assigned Gatekeeper at step 610. If the assigned Gatekeeper rejects the Gatekeeper Request, it responds with a Redirection Response to the subscriber unit at step 612, directing the subscriber to an alternate Gatekeeper. The subscriber then sends a Gatekeeper Request to the alternate Gatekeeper at step 614.

If the original Gatekeeper Request was accepted by the assigned Gatekeeper, the Assigned Gatekeeper sends a Gatekeeper Confirmation to the subscriber at step 616. Otherwise, if the alternate Gatekeeper was employed, the alternate Gatekeeper sends a Gatekeeper Confirmation to the subscriber at step 616. In response, the subscriber sends a Registration Request to the discovered Gatekeeper at step 618 and the discovered Gatekeeper then registers the subscriber at step 620 and sends a Registration Confirmation to the subscriber.

Figure 7:
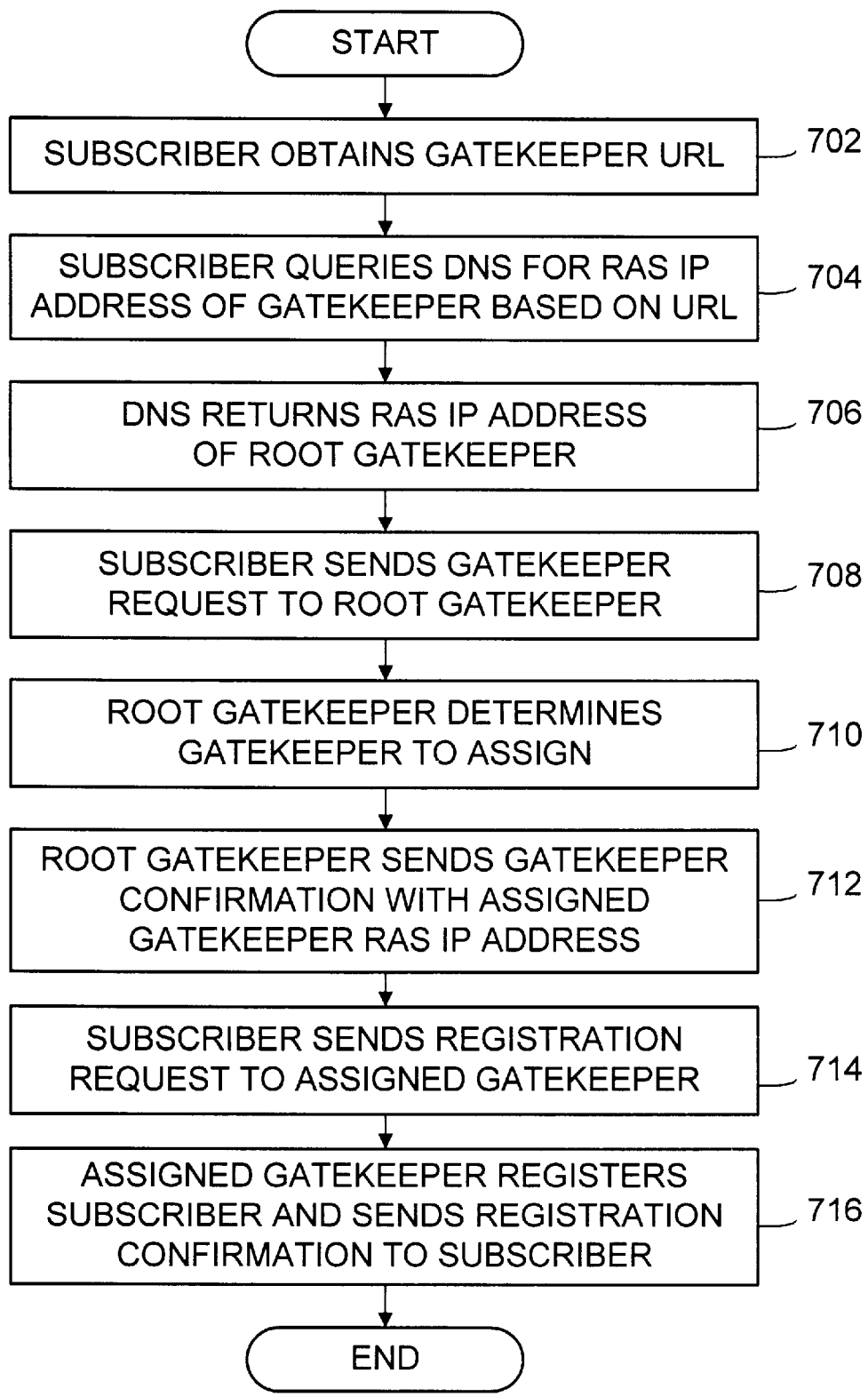
FIG. 7 is a logic diagram illustrating a Gatekeeper discovery and registration process according to the present invention for the Gatekeeper structure of FIG. 4A.

FIG. 7 is a logic diagram illustrating a Gatekeeper discovery and registration process according to the present invention for the Gatekeeper structure of FIG. 4A. First, at step 702, the subscriber obtains the FQDN (ABC.com) for the Gatekeeper. Then, at step 704, the subscriber queries the DNS for the RAS TSAP of the Gatekeeper. Since the DNS possesses only a single A record for Gatekeeper under the domain name ABC.com (corresponding to the Root Gatekeeper), the DNS returns the RAS TSAP of the Root Gatekeeper at step 706. The subscriber then sends a Gatekeeper Request to the Root Gatekeeper at step 708.

The Root Gatekeeper then determines which of the Gatekeepers it has in its zone to assign to the subscriber at step 710. Once the determination is made, the Root Gatekeeper sends a Gatekeeper Confirmation to the subscriber with the RAS TSAP of the assigned Gatekeeper at step 712. Then, the subscriber sends a Registration Request to the assigned Gatekeeper at step 714. The assigned Gatekeeper then registers the subscriber and sends a Registration Confirmation to the subscriber at step 716.

Figure 8:
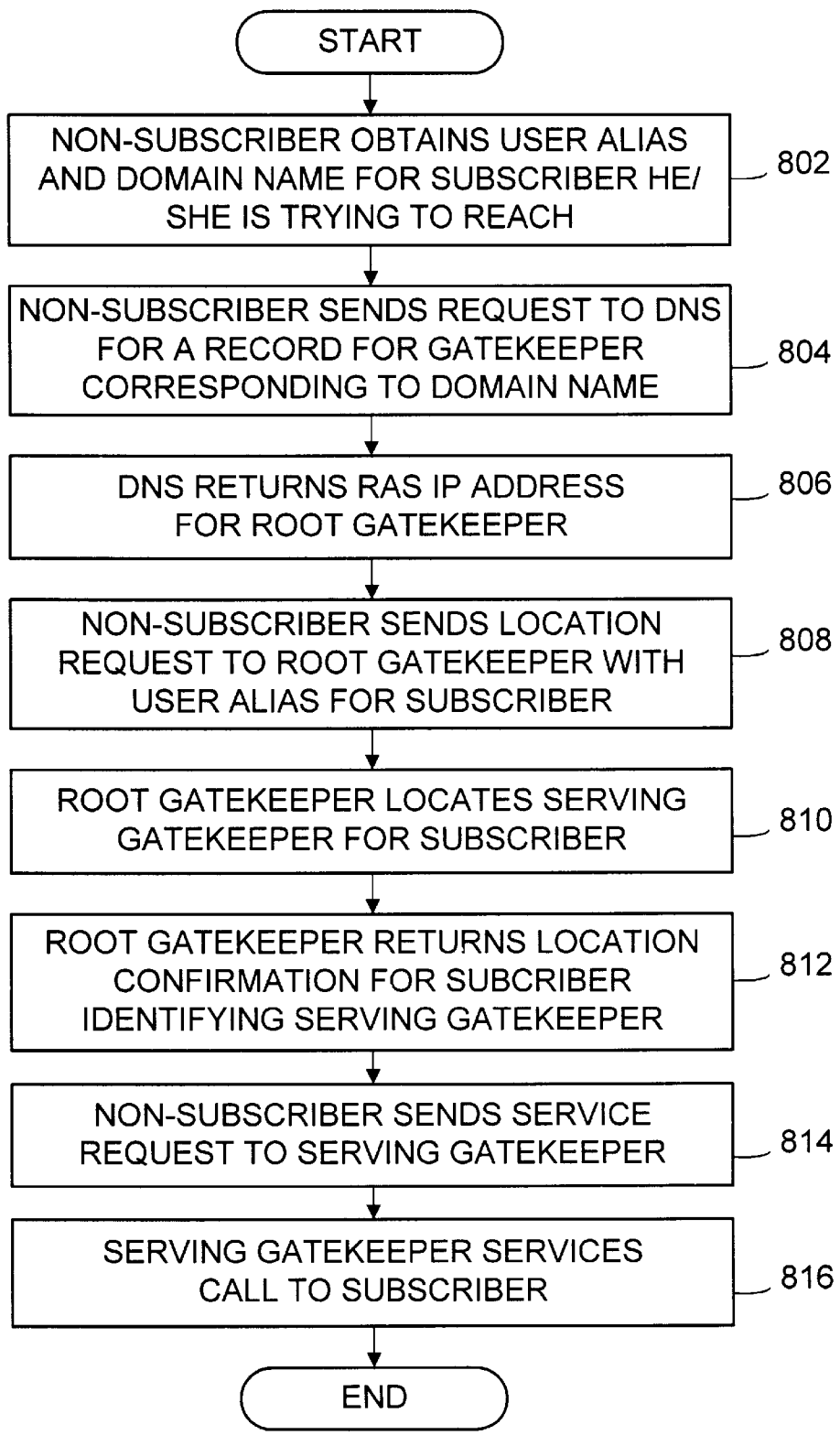
FIG. 8 is a logic diagram illustrating a subscriber location operation according to the present invention for the Gatekeeper structure of FIG. 4A.

FIG. 8 is a logic diagram illustrating a subscriber location operation according to the present invention for the Gatekeeper structure of FIG. 4A. Operation commences at step 802 where a non-subscriber obtains a subscriber alias and domain name for the subscriber he or she is trying to reach. At step 804, the non-subscriber then sends a request to the DNS for an A record for a Gatekeeper corresponding to the domain name. The DNS returns the RAS TSAP of the Root Gatekeeper for the domain name to the subscriber at step 806.

Upon receipt of the domain name of the Root Gatekeeper, the non-subscriber then sends a Location Request to the Root Gatekeeper with the subscriber alias for the subscriber at step 808. In response, the Root Gatekeeper locates the serving Gatekeeper for the subscriber at step 810 and at step 812 returns a Location Confirmation to the non-subscriber identifying the serving Gatekeeper for the subscriber. At step 814, the non-subscriber then sends a Service Request to the serving Gatekeeper. The servicing Gatekeeper then services the call to the subscriber at step 816.

When one subscriber seeks to locate another subscriber, the subscriber sends his or her request directly to the Root Gatekeeper, without separate access of the DNS if a single Root Gatekeeper exists for the IP telephony system. If multiple Root Gatekeepers exist, the subscriber may have to access the DNS. In another situation, if the Root Gatekeeper which the subscriber accesses does not support the subscriber sought, the Root Gatekeeper may direct the subscriber to another Root Gatekeeper.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In an Internet Telephony system that includes a plurality of Gatekeepers, a method of distributing subscriber load on the plurality of Gatekeepers comprising:

receiving a Gatekeeper record request from a subscriber that includes a domain name of the Internet Telephony system;

determining an assigned Gatekeeper from the plurality of Gatekeepers;

sending an address of the assigned Gatekeeper to the subscriber;

the assigned Gatekeeper receiving a Registration Request from the subscriber; and the assigned Gatekeeper registering the subscriber, wherein:

a domain name server receives the Gatekeeper record request from the subscriber;

the domain name server initiates operation of a registration load management unit to identify the assigned Gatekeeper; and the domain name server returns the address of the assigned Gatekeeper to the subscriber.

2. In an Internet Telephony system that includes a plurality of Gatekeepers, a method of distributing subscriber load on the plurality of Gatekeepers comprising:

receiving a Gatekeeper record request from a subscriber that includes a domain name of the Internet Telephony system;

sending an address of a Root Gatekeeper of the plurality of Gatekeepers to the subscriber;

the Root Gatekeeper receiving a Gatekeeper Request from the subscriber;

the Root Gatekeeper determining an assigned Gatekeeper from the plurality of Gatekeepers for the subscriber;

the Root Gatekeeper sending an address of the assigned Gatekeeper to the subscriber;

the assigned Gatekeeper receiving a Registration Request from the subscriber; and the assigned Gatekeeper registering the subscriber.

3. The method of claim 2, wherein:

a domain name server receives the Gatekeeper record request from the subscriber; and the domain name server returns the address of the Root Gatekeeper to the subscriber.

4. The method of claim 2, wherein in determining an assigned Gatekeeper from the plurality of Gatekeepers for the subscriber, a round-robin assignment methodology is employed.

5. The method of claim 2, wherein the assigned Gatekeeper is determined based upon a round-robin assignment methodology and a number of prior assignments that have been made to each of the plurality of Gatekeepers.

6. The method of claim 2, wherein the assigned Gatekeeper is determined based upon prior assignments that have been made to each of the plurality of Gatekeepers.

7. The method of claim 2, wherein the assigned Gatekeeper is determined based upon a username of the subscriber.

8. The method of claim 2, wherein the assigned Gatekeeper is determined based upon an address of the subscriber.

9. The method of claim 2, each of the plurality of Gatekeepers corresponds to the domain name.

10. The method of claim 9, wherein each of the plurality of Gatekeepers may also be accessed by its own unique domain name.

11. An Internet Telephony system that provides telephony service to a subscriber via an Internet Protocol network, the Internet Telephony system comprising:

a plurality of Gatekeepers coupled to the Internet Protocol network;

a registration load management unit that is initiated during a subscriber registration procedure; and the registration load management unit selecting an assigned Gatekeeper from the plurality of Gatekeepers so as to distribute subscriber load on the plurality of Gatekeepers.

12. The Internet Telephony system of claim 11, wherein the registration load management unit resides upon a domain name server that serves the Internet Protocol network.

13. The Internet Telephony system off claim 11, wherein the assigned Gatekeeper is determined based upon a round-robin assignment methodology.

14. The Internet Telephony system of claim 11, wherein the assigned Gatekeeper is determined based upon prior assignments that have been made to each of the plurality of Gatekeepers.

15. The Internet Telephony system of claim 11, wherein:

each of the plurality of Gatekeepers provides service to a segment of possible user identities; and the assigned Gatekeeper is determined based upon a user identity of the subscriber.

16. The Internet Telephony system of claim 11, wherein:

each of the plurality of Gatekeepers provides service to a respective address range; and the assigned Gatekeeper is determined based upon an address of the subscriber.

17. The Internet Telephony system of claim 11, each of the plurality of Gatekeepers corresponds to the domain name.

18. The Internet Telephony system of claim 11, further comprising a Root Gatekeeper, wherein the Registration Load Management Unit resides on the Root Gatekeeper.

19. The Internet Telephony system of claim 11, wherein:
   each of the plurality of Gatekeepers provides service to a respective subscriber segment; and
   the Root Gatekeeper assigns the subscribers to the plurality of Gatekeepers based upon a characteristic of the subscriber.

20. The Internet Telephony system of claim 19, wherein the Root Gatekeeper assigns a subscriber to the plurality of Gatekeepers based upon the subscriber's identity.

21. The Internet Telephony system of claim 19, wherein the Root Gatekeeper assigns a subscriber to the plurality of Gatekeepers based upon the subscriber's address.

22. The Internet Telephony system of claim 19, wherein the plurality of Gatekeepers are organized in a hierarchy below the Root Gatekeeper.

23. The Internet Telephony system of claim 11, wherein the plurality of Gatekeepers comprise:
   a plurality of Gatekeeper service nodes that provide Gatekeeper operating functions; and
   a plurality of Gatekeeper Database nodes that store subscriber registration information.

24. The Internet Telephony system of claim 23, wherein each of the plurality of Gatekeeper service nodes couples to each of the plurality of Gatekeeper Database nodes.

25. The Internet Telephony system of claim 23, wherein each of the plurality of Gatekeeper Database nodes corresponds to a respective subscriber segment.

26. The Internet Telephony system of claim 23, wherein each of the plurality of Gatekeeper service nodes corresponds to a respective subscriber segment.

27. The method of claim 1, wherein the assigned Gatekeeper is determined based upon a round-robin assignment methodology.

28. The method of claim 1, wherein the assigned Gatekeeper is determined based upon prior assignments that have been made to each of the plurality of Gatekeepers.

29. The method of claim 1, wherein the assigned Gatekeeper is determined based upon a username of the subscriber.

30. The method of claim 1, wherein the assigned Gatekeeper is determined based upon an address of the subscriber.

31. The method of claim 1, each of the plurality of Gatekeepers corresponds to the domain name of the Internet Telephony system.

32. The method of claim 31, wherein each of the plurality of Gatekeepers may also be accessed by its own unique domain name.

* * * * *